Sept. 19, 1950 H. M. BAYARD ET AL 2,522,738

PRECORRECTION FOR LINE DISTORTION IN TELEGRAPHY

Filed Feb. 26, 1948 10 Sheets-Sheet 1

INVENTORS
HONORE MARCEL BAYARD
RAYMOND JACQUES CHARLES ROQUET
BY Adams & Bush
ATTORNEYS

PRECORRECTION FOR LINE DISTORTION IN TELEGRAPHY

Filed Feb. 26, 1948 10 Sheets-Sheet 2

INVENTORS
HONORE MARCEL BAYARD
RAYMOND JACQUES CHARLES ROQUET
By Adams & Bush
ATTORNEYS INVENTORS
HONORE MARCEL BAYARD
RAYMOND JACQUES CHARLES ROQUET
BY Adams & Bush
ATTORNEYS INVENTORS
HONORE MARCEL BAYARD
RAYMOND JACQUES CHARLES ROQUET
BY Adams & Bush
ATTORNEYS Sept. 19, 1950 H. M. BAYARD ET AL 2,522,738

PRECORRECTION FOR LINE DISTORTION IN TELEGRAPHY

Filed Feb. 26, 1948 10 Sheets-Sheet 5

INVENTORS
HONORE MARCEL BAYARD
RAYMOND JACQUES CHARLES ROQUET
By Adams & Bush
ATTORNEYS

PRECORRECTION FOR LINE DISTORTION IN TELEGRAPHY

Filed Feb. 26, 1948 10 Sheets-Sheet 6

INVENTORS
HONORE MARCEL BAYARD
RAYMOND JACQUES CHARLES ROQUET
BY
Adams & Bush
ATTORNEYS

PRECORRECTION FOR LINE DISTORTION IN TELEGRAPHY

Filed Feb. 26, 1948 10 Sheets-Sheet 7

INVENTORS
HONORE MARCEL BAYARD
RAYMOND JACQUES CHARLES ROQUET
BY Adams & Bush
ATTORNEYS INVENTORS
HONORE MARCEL BAYARD
RAYMOND JACQUES CHARLES ROQUET
BY Adams & Bush
ATTORNEYS INVENTORS
HONORE MARCEL BAYARD
RAYMOND JACQUES CHARLES ROQUET
By Adams & Bush
ATTORNEYS Sept. 19, 1950 H. M. BAYARD ET AL 2,522,738

PRECORRECTION FOR LINE DISTORTION IN TELEGRAPHY

Filed Feb. 26, 1948 10 Sheets-Sheet 10

INVENTORS
HONORE MARCEL BAYARD
RAYMOND JACQUES CHARLES ROQUET
By Adams & Bush
ATTORNEYS Patented Sept. 19, 1950 2,522,738

UNITED STATES PATENT OFFICE 2,522,738

PRECORRECTION FOR LINE DISTORTION IN TELEGRAPHY

Honoré Marcel Bayard, Meudon, and Raymond Jacques Charles Roquet, Clamart, France Application February 26, 1948, Serial No. 11,278
In France August 22, 1946

Section 1, Public Law 690, August 8, 1946
Patent expires August 22, 1966

7 Claims. (Cl. 178—69)

The present invention relates to telegraph systems using code transmission, for correcting line distortion of signal elements, and in particular to means and methods for the precorrection or advance correction of such signal elements of the transmitter.

In our copending application, Serial No. 593,164, filed May 11, 1945, and now abandoned, we have disclosed a system for the advance correction of the characteristic line distortion of signals arising on telegraph transmission lines, consisting in applying to the sending end of the transmission line, a signal modulation which is not the theoretically perfect modulation which should be transmitted and should be delivered to the receiving station, but instead is a signal modulation intentionally and suitable distorted, called advance corrected modulation, which after it has undergone a distortion arising during its passage over the transmission line, assumes at the receiving station a form as close as possible to that of the original perfect modulation which was transmitted, and which it is desired to receive undistorted.

The "characteristic instant" of a signal element is the specific instant at which the signalling current or voltage is varied or modulated by keying action, from one value to another, as from positive to negative and at this instant the relay armature swings from one stop to the other.

The present application relates to the employment of the system according to our said copending application, to the transmission of a trivalent signal modulation, that is, a signal having three values as plus, zero, minus. Our said copending application related primarily to a particular manner of advance correction of a bivalent signal modulation, and is a signal using a code having two values, as plus and minus.

The present application is based upon the fact that the "propagation time" which elapses between the instant characteristic of the three-value or trivalent modulation applied to the sending end of the transmitting line, and the instant characteristic of the delivery of the trivalent modulation at the remote receiving end of the transmission line, depends not only upon the signal elements which precede the given signal element which is to be transmitted at the characteristic instant considered, but also depends upon the parameter of this signal, that is, whether it is positive, zero, or negative. The arrangement to which this present application relates and which will be described hereinafter, is applicable without substantial modification or with only simple modifications, in detail, to any kind of signal modulation comprising three values of the transmitted current, even if there is no restriction as to the nature of the possible sequences of the signal elements of different values. However, with a view to simplifying the following description of the system, an example of a signal modulation in recorder code will be described having trivalent and bivalent signal elements of uniform length, as generally used on submarine cables.

The particular three-value signal here described, will have values of plus, zero and minus. The particular two-value signal here considered will have values of plus and minus.

For the same reason, it will be assumed that the parameters of the three-value keyed signal modulation are +1, zero, or −1, that is, the signals may be either positive or negative, or may be replaced by a complete absence of transmitted current, that is, zero.

The delay which is experienced by a given signal element while being transmitted over a line depends on the residual charge then still existing on the line as derived from the transmission of preceding signal elements, and, consequently, on the polarity which those preceding signal elements had with reference to the polarity of the signal element which is being transmitted at the instant. If, for a given line, the delay on a given signal element was a constant and independent of the nature of adjacent successive signal elements, there would occur only a simple displacement of the entire set of signal elements, but no "characteristic distortion" at the instant of change in current value, and the problem to whose solution the present invention is directed, would not exist.

Our invention will be understood from the following description and the accompanying drawings wherein like characters of reference designate corresponding elements, and wherein.

Figure 1:
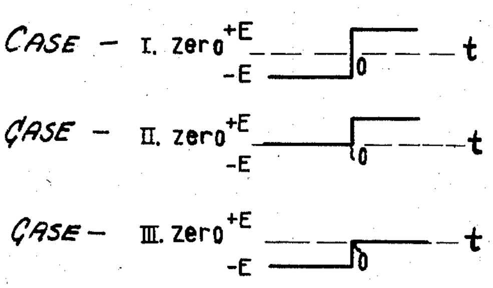
Fig. 1 shows the possible combinations of two successive elements of a three-value telegraph code signal, using positive, zero and negative current values, for combinations involving a change of value of current.

As to the keying displacement of the sending keying element at a characteristic instant when the value of the transmitted current changes, six different cases may arise. By considering inversion of the signs of the signal elements, these six cases may be reduced to three, which are shown in Fig. 1. The movement of the sending keying element at a characteristic instant is called the characteristic movement of the transmitter.

*Case I.*—The characteristic movement of the transmitter at a characteristic instant, causes the potential applied to the initial sending end of the line channel to pass from the minus sign to the plus sign.

*Case II.*—The characteristic movement of the keying transmitter causes the potential applied to pass from zero to plus.

*Case III.*—The characteristic movement of the transmitting key causes the potential applied to pass from minus to zero.

The advance correction of the signal must take these three cases into account, and moreover, must take into account the signals which precede the characteristic instant of the change of current at the beginning of the given signal element. It will be assumed in what follows that the transmission is full, that is, each individual signal element is unvarying direct current throughout the duration of such signal elements, as distinguished from systems in which current is transmitted during only a fraction of the duration of a signal element.

It will be noted that if the given signal element to be transmitted is positive (Cases I and II) or is zero (Case III) and starts with a characteristic instant, the last previous signal element is negative (Cases I and III) or zero (Case III). It is the same except for the sign if the given signal element to be transmitted is negative or zero. If such were not the case, there would be no change in current value at the beginning of the given element, and the zero instant would not be "characteristic," and there would be no need for advance correction.

On the other hand, the penultimate previous signal element (the one which starts at a time of minus twice the length of a signal element before the initial instant of the given signal element) may have any value, plus, zero or minus, and the same would apply to the other preceding signal elements if a greater number of such preceding signal elements are under consideration.

Figure 2:
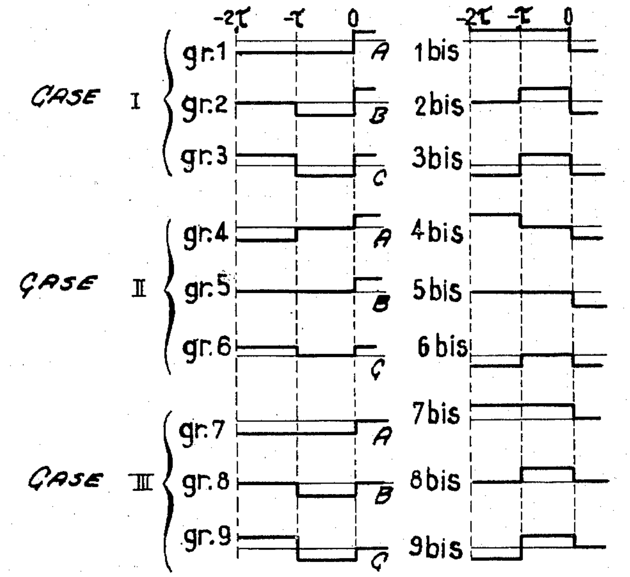
Fig. 2 shows the possible combinations of three successive elements of a three-value telegraph code signal, using positive, zero and negative current values, for combinations involving a change of value between the instant signal element and the immediately preceding signal element.

If the number of previous signal elements under consideration is restricted to two signal elements preceding the given signal element, the different combinations or groups of signal modulations possible for a three-value signal, are as shown in Fig. 2, which shows the groups of modulations according to the mentioned Cases I, II, III to which they belong, as shown in Fig. 1. The groups or sequences of signal modulations to be considered are eighteen in number but they correspond to each other two by two by inversion of signs, so that in Fig. 2 they are designated by the numbers 1, 1 bis, 2, 2 bis, and so forth. Any particular group or sequences designated by "bis" is a mirror image of the corresponding group not so designated by "bis." In Fig. 2, there have been omitted those possible sequences of signal elements for which the immediately preceding signal element is of the same value as the given signal element, since such a sequence does not require correction and is not a "characteristic instant." The advance correction method to which our previously mentioned copending application relates, is applied in the arrangement according to the present application, with the precaution of taking into account the given signal element to be transmitted, besides the previous signal elements for a two-value signal code, and also with the reservation as to the present application which is self-evident that the parameters (plus, zero, minus) of the signal keying or modulation are three in number, that is, a three-value code is used.

The present arrangement, therefore, comprises the same general devices: recorder, selector, retarder, advance-corrected modulation transmitter, as our said copending application, but the several system units just mentioned are, however, modified and adapted for use with the particular case employed of a trivalent or three-value keying signal modulation which is used.

The accompanying drawings give a number of examples for carrying into effect the arrangements according to the present invention, wherein the number of the previous signal elements considered is supposed to be equal to two, and the transmission is assumed to be full, that is, each signal element is unvarying direct current throughout its duration.

The described examples may be applied by obvious adaptation to the case in which the number of the previous signal elements is any desired number greater than two.

It will be assumed in the following description that the keyed input signal modulation is undistorted or perfect, that is, it has a straight front and terminal. In the case in which it may not be so, a conventional rectifier arrangement would be added to the system to which this present invention relates.

Figure 3:
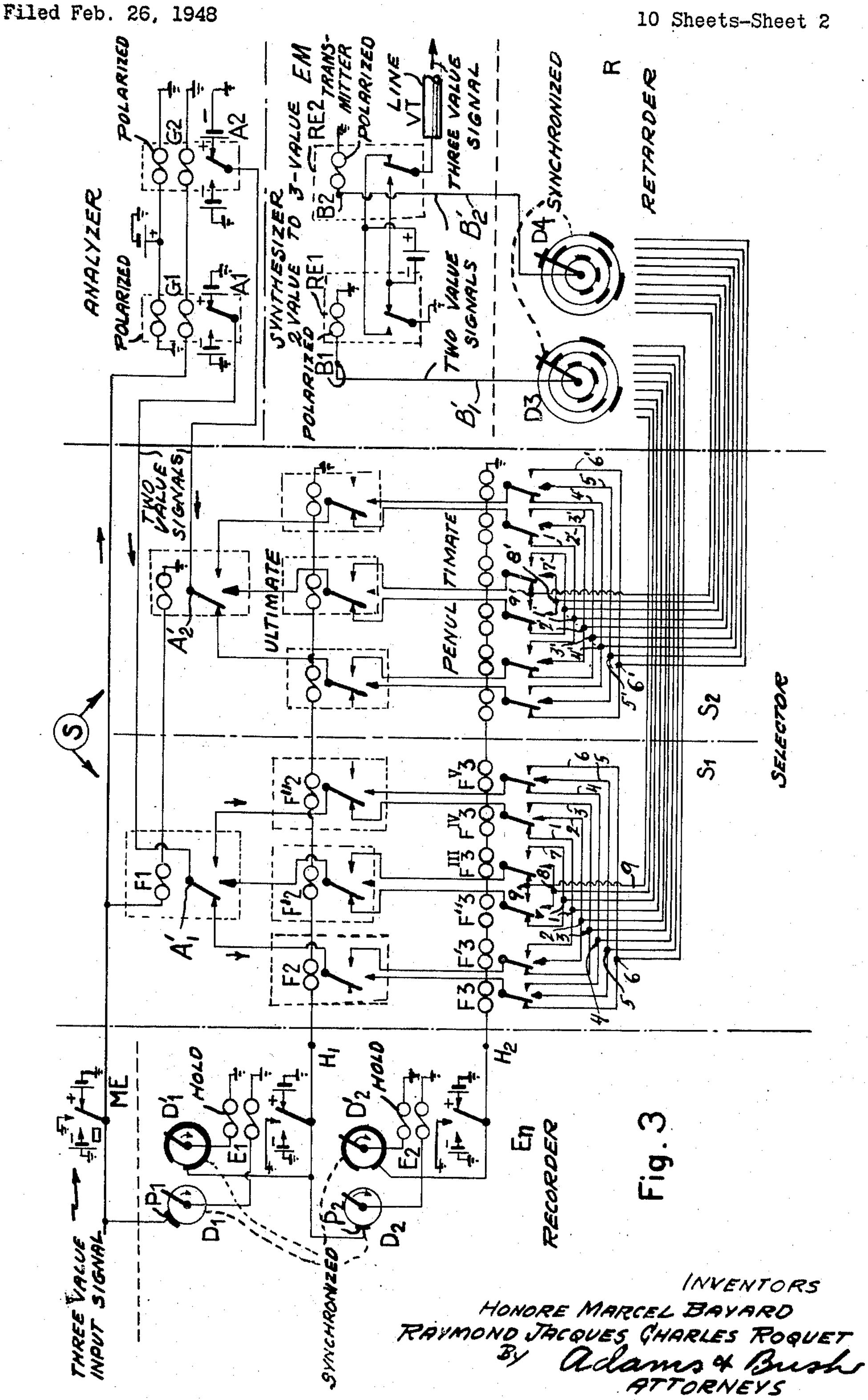
Fig. 3 shows a system for the pre-correction at the transmitter of a given signal element and the two immediately preceding signal elements, including means for separating the input three-value signal into two corresponding two-value signals, means for separately correcting both two-value signals, and means for recombining the two-corrected two-value signals into one corrected three-value signal.

Fig. 3 shows an example of the advance-correcting device at the transmitter, employing distributors, three-position relays termed trivalent relays, and any desired number of polarized relays.

In the figures, $E_n$ represents the recorder of preceding signal elements, preceding the given transmitted signal element, the parts $S_1$ and $S_2$ represent together the selector S, R is the retarder part, and $E_m$ is the transmitter part for transmitting the advance-corrected signals.

The input modulation signal from the sending key is applied at ME. In Fig. 3, the input converter transforming unit for transforming a three-value signal element into two two-value signal elements, comprises two polarized relays $G_1$ and $G_2$ of usual type respectively connected to the armatures of the two initial relays of the two selectors.

$D_1$, $D_2$, $D'_1$, $D'_2$ are rotary distributors, the brushes of which complete one complete revolution during the period of the elementary interval of modulation. They are synchronously related to the input signal modulation either by a driving device integral with the time base of the distributor generating the input signal modulation ME, or through a conventional device for synchronism correction, or by any other suitable means. It is also possible to use rotary distributors, the brushes of which effect one complete revolution during a time multiple of the duration of a signal element. In this case, it is sufficient to take account of this in the arrangement of the connections, provided that the circuits be arranged in succession as is indicated.

The brush and the connection $P_1$ of the distributor $D_1$ are arranged as shown in Fig. 3 so that the brush comes into contact with the connection $P_1$ before the end of each elementary interval of the signal modulation ME, and leaves it exactly at the end of this interval.

The brush and the connection $P_2$ of the distributor $D_2$ are arranged so that the brush comes in contact with the connection $P_2$ before the brush $D_1$ comes in contact with the connection $P_1$, and leaves it exactly when the brush of the distributor $D_1$ touches the connection $P_1$.

The length of the connections of these rotary distributors is such that the time during which the distributor contact segments are in contact with the brush, is just sufficient to operate a relay, for example two milliseconds.

The distributors $D'_1$ and $D'_2$ are exactly complementary to distributors $D_1$ and $D_2$, respectively, as to their closed intervals and open intervals.

The relays $E_1$ and $E_2$ are three-position or trivalent relays of usual type with three-positions and three controlled contacts and each furnished with two windings, one of which serves as a holding winding, and normally assume a mid position when not energized.

The manner of operation of the recorder comprising distributors $D_1$, $D_2$, $D'_1$, $D'_2$ and relays $E_1$ and $E_2$, is as follows:

A given primary signal element which is to be precorrected is recorded by the relay $E_1$ as from the instant at which the brush of the distributor $D_1$ comes into contact with the connection $P_1$, that is, at the end of this signal element. This relay retains its position because of its holding circuit. If the signal is of zero polarity, that is, zero value, the holding circuit having been broken for an instant by the distributor $D_1$, the relay $E_1$ becomes fixed or remains fixed across its mid contact position. In a trivalent signal system, employing signal elements constituted of positive values of current, negative values of current, and signal elements during which current is entirely absent, the latter signal elements are said to have "zero polarity."

At the end of the following course or turn of rotation, the relay $E_1$ initiates actuation of the relay $E_2$ following an analogous procedure, causing the application of voltage to the distributors $D_2$ and $D'_2$.

It has been explained that when the brush of rotary distributor $D_1$ initially touches sector $P_1$, the voltage of the polarity existing on the armature of relay ME is applied to the lower winding of relay $E_1$, the armature of this relay $E_1$ then assumes the same position as relay ME, and remains there after the brush of rotary distributor $D'_1$ reaches a conducting sector so that the lower holding winding of relay $E_1$ is energized.

It is not until the next rotation that the voltage of the polarity existing on the armature of relay $E_1$ will be applied to the winding of relay $E_2$. It will be seen that on the first turn, the brush of rotary distributor $D_2$ has already been separated from sector $P_2$ when the brush of rotary distributor $D_1$ initially touches sector $P_1$.

Upon the following turn, when the brush of rotary distributor $D_2$ initially touches sector $P_2$, the voltage of the polarity existing on the armature of relay $E_1$ is applied to the lower winding of relay $E_2$, whose armature swings in the corresponding direction. When the brush of the rotary distributor $D_2$ has left sector $P_2$ the brush of rotary distributor $D'_2$ assumes a position to touch its conducting sector, and energizes the upper holding winding of relay $E_2$.

Therefore, there exists on the armature of the relays $E_1$ and $E_2$, respectively, a "secondary" modulation of a signal element retarded in time in relation to the given (primary) input signal modulation ME to be pre-corrected by an interval substantially equal to the duration of one signal element (reduced by the time of passage of the connection $P_1$), and a "tertiary" signal modulation element retarded substantially by twice the same time interval in relation to the "primary" input signal modulation, that is, by twice the interval of a signal element (reduced by the time of passage of the connections $P_1$ and $P_2$) in relation to the "primary" input signal modulation ME.

The selector is composed of two identical parts $S_1$ and $S_2$ respectively for the two two-value signal elements as produced by the converter comprising polarized input transforming relays $G_1$, $G_2$.

The relays $F_1$, $F_2$, $F'_2$, $F''_2$, $F'_3$ $F''_3$, $F'''_3$, $F^{IV}_3$ and $F^{V}_3$ are three-position or trivalent relays of usual type.

The relays $F_1$ of the selector part $S_1$ for one bivalent signal and the selector part $S_2$ are excited simultaneously, for example, by connecting their windings in series as indicated in Fig. 3.

The relays of index 2, that is, the relays having "2" in their designations, of the selector part $S_1$ and of the selector part $S_2$, are excited simultaneously by an analogous connection as by connecting their actuating windings in series.

The same applies for the relays of index 3 of the selector parts $S_1$ and $S_2$, that is, those having "3" in their designation.

In consequence, it will be evident by following the circuit of Fig. 3, that the armatures of the relays of index 1 of the selector parts $S_1$ and $S_2$, reproduce simultaneously by their position the "primary" input signal modulation ME, and that the armatures of the relays of index 2 of the selector parts $S_1$ and $S_2$ reproduce simultaneously the "secondary" modulation of the first preceding signal element, and that the armatures of the relays of index 3 of the selector parts $S_1$ and $S_2$ reproduce simultaneously the "tertiary" signal modulation element, that is, the second preceding signal element, with their retardations, as has been explained.

For the purpose of reducing the number of relays, it is possible to use relays having a plurality of armatures. By relays of index 3 there are meant the relays having "3" in their designation.

For example, it is possible to unite into one signal relay, two corresponding relays of the two selector parts $S_1$ and $S_2$, provided that this signal relay has two armatures each having its three respective controlled contacts.

The manner of operation of the selector part $S_1$ is the following:

The input primary signal modulation ME is represented by the relay $F_1$, the armature of which selects for actuation by the connections to its controlled contacts, according to the sign of each signal element (plus, zero, minus), one of the armatures of relays $F_2$, $F'_2$ or $F''_2$.

The secondary or ultimate modulation is reproduced simultaneously by all the relays $F_2$, $F'_2$, $F''_2$ whose actuating windings are connected in series, the armatures of which select the armatures of the relays of index 3 as $F_3$, according to the sign of the first previous signal element.

Finally the tertiary or penultimate modulation is reproduced simultaneously by all the relays of index 3 whose actuating windings are connected in series, which select according to the sign of the second previous signal element the circuit Nos. 1, 2, 3, . . . 9 each of which corresponds to one of the modulation signal sequences of Fig. 2.

Owing to this cascade connecting arrangement of the relay armatures, metallic circuit continuity is established, from the terminal $A_1$ as far as one of the terminals Nos 1, 2, 3, . . . 9, according to the group of incident signal modulation. It will be noted that the groups of modulation of opposite signs correspond to the same circuit Nos. 1, 2, . . . 9.

The manner of operation of the selector part $S_2$ for the other bivalent signal is strictly identical with that of the selector part $S_1$ at any instant. It establishes the metallic circuit continuity as from the terminal $A_2$ as far as one of the terminals 1', 2', 3' . . . 9' which correspond with those of the selector part $S_1$.

It is evident according to the principle of the system, that the number of relays of a given index could have been interchanged, that is, it would have been possible to take six relays of index 1, and one single relay of index 3, in one of the selector parts $S_1$ and $S_2$ or in the two simultaneously.

The retarder R comprises two rotary distributors which are synchronized and simultaneous, $D_3$ and $D_4$ each having nine connections the orientation of which is adjustable. The connections are distributed over one or more banks, in Fig. 3 they have been distributed over three banks and in the same manner for both $D_3$ and $D_4$ by way of example.

For each distributor $D_3$ and $D_4$ the several banks are traversed by one and the same brush, or several brushes mechanically and electrically integral, arranged to play the part of one single brush.

The brush assumed to be one single brush of each distributor $D_3$, $D_4$, effects one complete revolution during the time of the duration of one signal element, under the same synchronized conditions as the other distributors, but is slightly retarded as compared with the latter either for instance by 1 to 3 milliseconds, that is that the first connection is contacted 1 to 2 milliseconds after the brush of the distributor $D_1$ has left the connection $P_1$.

The length of the segment connections of the banks is such that the time of scanning is sufficient to operate a relay which may be polarized as desired.

The orientation of the connections and brushes of the distributors $D_3$ and $D_4$ is such that the corresponding connections are synchronously simultaneously scanned.

The terminals 1, 2, 3 . . . 9 of the part of the selector $S_1$ are connected each to one of the distributor-connections $D_3$. Similarly the terminals 1', 2', 3' . . . 9' of the selector part $S_2$ are connected in the same order to the corresponding connections of the distributor $D_4$.

The brush of rotary distributor $D_3$ being connected to the sender terminal $B_1$ and that of distributor $D_4$ to the sender terminal $B_2$, the unit $S_1D_3$ establishes metallic circuit continuity between the terminals $A_1$ and $B_1$ at instants determined by the incident signal modulation group, and the unit $S_2D_4$ establishes at the same instants metallic continuity between the terminals $A_2$ and $B_2$.

In the input unit for transforming a three-value signal element into two corersponding two-vilue signal elements, the relays $G_1$ and $G_2$ are relays polarized as desired with two windings of usual type. Their function is to replace the three-value input signal modulation ME which comprises positive, negative or zero signals, by the unit of two modulations which are two-value or bivalent (positive and minus). They could be replaced by any other arrangement accomplishing the same object.

The reconverting output transmitting relays $RE_1$ and $RE_2$ are relays polarized as desired of usual type, which reestablish the trivalent modulation by the synthesis of two bivalent modulations as connected in the output of distributors $D_3$ and $D_4$. The circuits of relays $G_1$ and $G_2$ on the one hand, of relays $RE_1$ and $RE_2$ on the other hand, are of usual type.

Assuming that $A_1$ and $B_1$ terminals on the one hand have been provisionally connected together, and $A_2$ and $B_2$ on the other hand are provisionally connected together, it is understood that the trivalent signal modulation ME is broken up by converter $G_1$ and $G_2$ into two bivalent modulations, separately actuating relays $RE_1$ and $RE_2$, respectively, and that the armatures of these two latter relays acting as reconverters reproduce the three-value modulation ME which is thus applied to the transmission line VT leading to the remote receiving station.

The unit formed by $S_1$ and by $D_3$, only puts output transmitting relay $RE_1$ into communication with the armature of the converting relay $G_1$, at certain instants retarded in relation to the characteristics instants of the input signal modulation ME, as if it were a bivalent modulation which was to be advance-corrected. The unit $S_2D_4$ places output transmitting relay $RE_2$ in communication with the armature of the converting relay $G_2$ exactly at the same instants. The characteristic instants of the change in current values of the two bivalent modulations therefore are subjected separately to identical retardations specific to the sequence of the group of incident trivalent modulation consisting of the given signal element and the two immediately preceding elements.

It results from this arrangement that the trivalent modulation synthesis of the two bivalent modulations, is advance-corrected; it is sufficient to adjust experimentally or according to the result of theoretical or measurement calculations, the position of the contacts of the rotary distributors $D_3$ and $D_4$ in such manner that the distortion of the signal modulations delivered by the transmission line will be reduced to a minimum according to the fundamental principle of the advance-correction of the distortion.

It happens for certain positions of the armatures of the relays comprising the selector that the communication between terminals A and B is interrupted by the relays F of index 2; that is, those having a "2" in their designation, these positions correspond to the groups of modulations not comprising a characteristic instant with regard to the instant O, that is, those which do not change current value at that instant. In fact no advance correction is to be considered in this case. The output transmitting relays $RE_1$ and $RE_2$ being polarized as desired, then remain in their position until there appears a characteristic instant in the signal modulation transmitted when there is a change of current value, which brings about advance correction.

Figure 4:
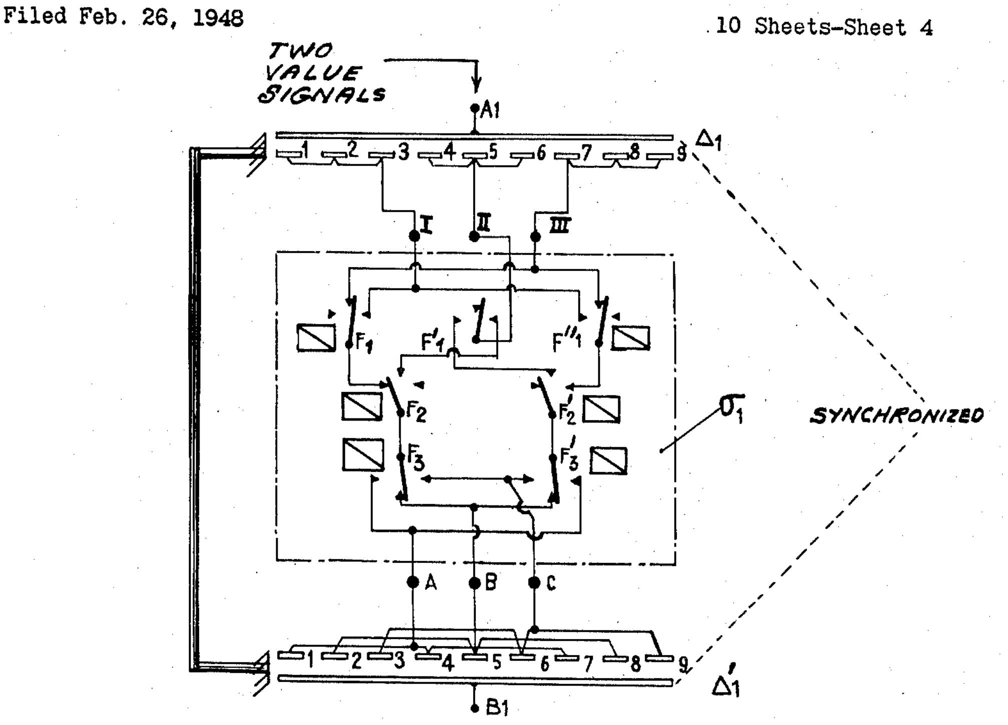
Fig. 4 shows a modification of the system of Fig. 3 for two preceding signal elements using a simplified arrangement of relays and two synchronized rotary switches.

Fig. 4 represents a modification of the unit of selector-retarder of Fig. 3 based on the following observations:

If in a tabular statement, all the numbers of the groups of modulation (not including the bis signals sequences with inverted signs or mirror images) be tabulated, those belonging to the Cases I, II, III, respectively, being aligned in three vertical columns, in the order in which they are presented in Fig. 2, and if in a second tabular statement there be shown all the numbers of the groups (not bis), placing on three horizontal lines respectively, those of which the penultimate previous signal is negative, zero or positive, always following the order of Fig. 2, it will be found that the two tabular statements are identical.

Therefore in one single Table T1 in which the vertical lines correspond respectively to the Cases I, II, III we may tabulate the following:

*Table T1*

| | Case I | Case II | Case III | Penultimate Signal Element |
|---|---|---|---|---|
| Case A | 1 | 4 | 7 | – |
| Case B | 2 | 5 | 8 | 0 |
| Case C | 3 | 6 | 9 | + |

and the horizontal lines in three new cases termed respectively A, B, C.

It will be noted that in the sequences of "Case I" there is a change to a positive given signal element from a negative "ultimate" or first preceding signal element, and in Case II to a positive given signal element from a zero first preceding signal element, and in Case III to a zero given signal element from a negative first preceding signal element. In the case of the corresponding mirror image or "bis" sequences, in Case I there is a change to a negative given signal element from a positive first preceding signal element, in Case II a change to a negative given signal element from a zero first preceding signal element, and in Case III a change to a zero given signal element from a positive first preceding signal element.

According to the arrangements of this Table T1, each group of keying sequence modulations may be designated by its coordinates, that is by the two "cases" to which it appertains, and inversely the designation of two cases (the one of the series I, II, III, the other of the series A, B, C) is sufficient to designate a group or sequence of modulations in unambiguous manner. For example, the group 8 appertains to the Cases III and B, and conversely the association of Cases III and B designates group 8.

By inversion of the signs, the bis groups of Fig. 2 which are mirror images become incorporated in the others in evident manner; no detailed discussion has been made of these bis groups with the view to simplifying the description.

For purposes of simplification, Fig. 4 only represents half of the selector-retarder group, that for example which replaces everything connected between the terminals $A_1$ and $B_1$ in Fig. 3. The other portion which is identical therewith would replace all connected between by the terminals $A_2$ and $B_2$ of Fig. 3. In order to simplify yet further, in Fig. 4 the excitation windings of the relays located in the same position as shown in Fig. 3, have not been represented; in fact in the selector, the designations of relays of index 1 (those having "1" in their designation) alone are shown with those of index 2 and index 3 and the circuits including their armatures and stops.

The selector part $\sigma_1$ of Fig. 4 comprises three terminals I, II, III corresponding respectively to the Cases I, II, III, and three terminals A, B, C, corresponding respectively to the Cases A, B and C. The armatures and stops of the relays connect one of the terminals I, II, III, with one of the terminals A, B, C, according to the sequence of the incident modulation group.

In fact, the armatures $F_1$, $F'_1$, $F_2$, and $F'_2$ select the Cases I, II, and III: the armatures $F_3$ and $F'_3$ select the Cases A, B and C; the circuit is established in one single manner specific to the group of combinations registered by the rotary distributors that is, by the combinations of signals shown in Fig. 2. The actuating windings of these relays are actuated by connections as in Fig. 3.

Account has been taken of the bis and non-bis groups in the establishment of the connections.

The unit selector-retarder (half of which is shown in Fig. 4) comprises four identical rotary distributors $\Delta_1$, $\Delta'_1$, $\Delta_2$ and $\Delta'_2$ having strictly the same characteristics as the distributors $D_3$ and $D_4$ of Fig. 3, and synchronized with the recorder distributors D, $D_1$, $D_2$, $D'_2$ of Fig. 3.

Referring now to Fig. 4, the rotary distributors delta 1 and delta' 1 are shown developed horizontally in order to render examination of the same more easy. Moreover considering that their connections have adjustable orientation, the relative arrangements of these upon the Figure 4 do not presuppose their actual orientation at any instant.

The connections of the distributor delta 1 are connected according to their affiliation to the terminals for Cases I, II, III. Those of the distributor delta' 1 are arranged according to their affiliation to the terminals for Cases A, B, C.

The manner of operation of the unit of Fig. 4 is the following:

Let us assume for example that the group of modulations (incident) is the group 8.

Group 8 belongs to Cases III and B, a connection is established from terminal for Case III to terminal B through the following relays:

| | |
|---|---|
| $F_1$ | mid-stop |
| $F_2$ | left-hand stop |
| $F_3$ | mid-stop |

If the modulation group had been 8 bis (the mirror image of 8) the connection between the terminals III and B would have been established by:

| | |
|---|---|
| $F'_1$ | mid-stop |
| $F'_2$ | right-hand stop |
| $F'_3$ | mid-stop |

Whether it be a matter of group 8 or of group 8 bis taken as example, it is found that the electrical continuity between the terminals $A_1$ and $B_1$ is only established when the brushes of delta 1 and of delta' 1 pass through the connections 8 (it should be borne in mind that these brushes pass simultaneously across the corresponding connection) which ensures the control of the transmission relays at the desired moment specific to the incident modulation group.

If instead of taking into consideration two previous signal elements, as in Fig. 3, three previous signal elements had been taken, as each of the cases A, B, C, then three others would have been produced according to the sign of the previous antepenultimate signal element or third preceding signal element. Each modulation group would have been designated by the three "cases" to which it appertains: one in series I, II, III, the other in series A, B, C, the third in the series $\alpha$, $\beta$, $\gamma$. Inversely, by selecting arbitrarily one case in the series I, II, III, one case in the series A, B, C, and one case in the series $\alpha$, $\beta$, $\gamma$, one group of modulations would be unambiguously designated. The generalization as to previous signals is evident by analogy with a cartesian coordinate system with $n$ axes.

The circuit of Fig. 3 will, it will be understood, be capable of extension to any number of previous signals.

The same does not apply to the circuit of Fig. 4 which is simplified, owing to the fact that in Fig. 4 the number of previous or preliminary signals is restricted to two.

Figure 5:
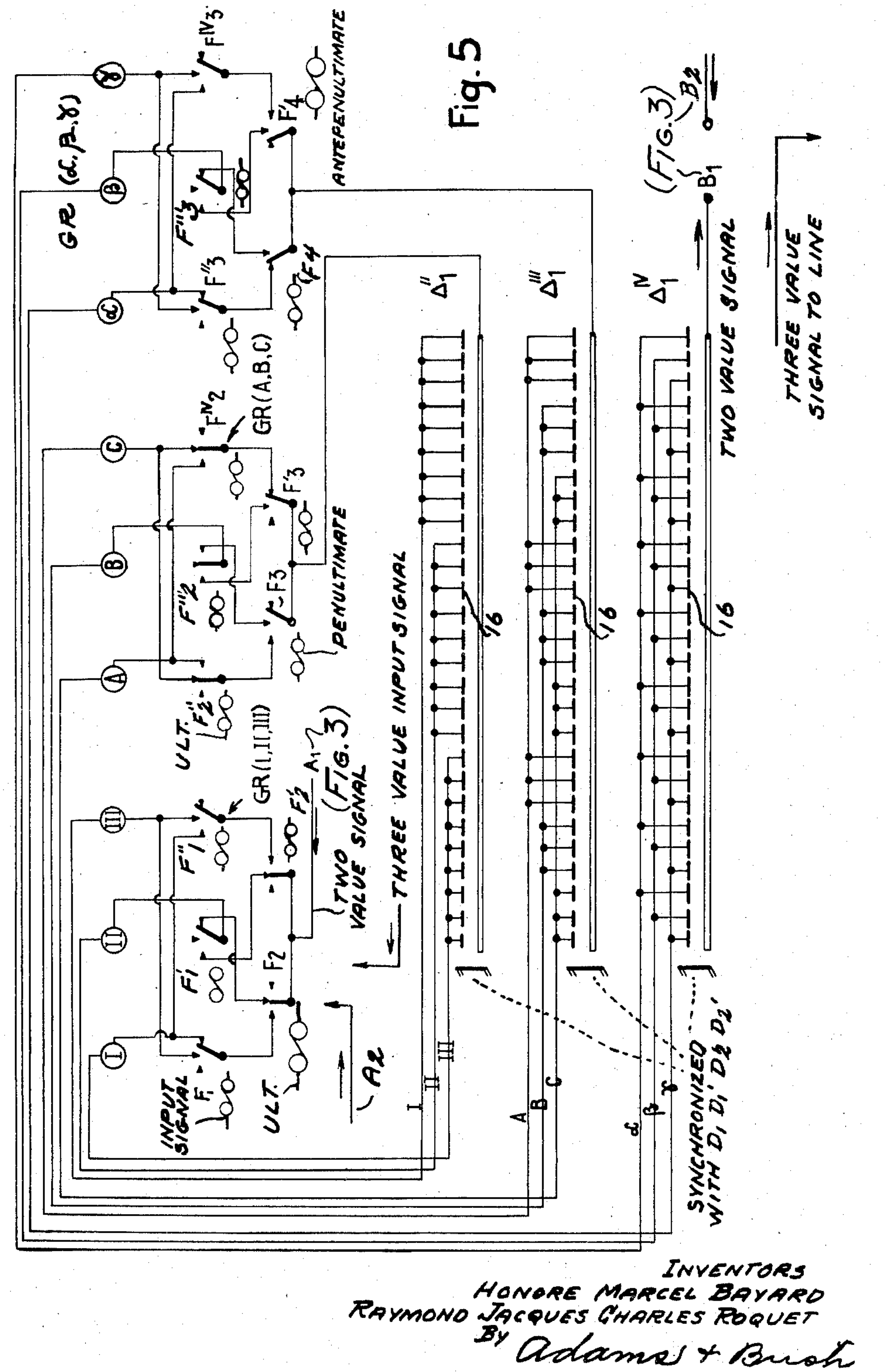
Fig. 5 shows a pre-correction system similar to that of Figs. 3 and 4 but for three preliminary signals preceding the given signal.

Fig. 5 gives an example of a selector-retarder with three preliminary signals based upon the same principle as that shown in Fig. 4, applicable evidently to $n$ preliminary signals, $n$ being as desired.

Fig. 5 does not show the excitation windings of the relays. Moreover, this Figure 5 only shows half of the selector-retarder, the half which is to establish at any suitable instant the connection between the points reconversion output $A_1$ and conversion input $B_1$ of Fig. 3 corresponding to one bivalent component.

This half of the selector-retarder comprises:

Three groups of three position relays, GR, I, II, III, GR (A, B, C), GR ($\alpha$, $\beta$, $\gamma$), each of these groups corresponding respectively to the series I, II, III, to the series A, B, C, and to the series $\alpha$, $\beta$, $\gamma$. The connections of the actuating windings of these relays are as in Fig. 3, and are not shown.

The group of relays GR (I, II, III) comprises three relays $F_1$, $F'_1$, $F''_1$, concerned with the original input signal modulation of the signal element to be corrected, and two relays $F_2$ and $F'_2$ related to the ultimate or secondary modulation element.

The group of relays GR (A, B, C) comprises three relays $F''_2$, $F'''_2$, $F^{IV}_2$, related to the secondary or ultimate modulation element, and two relays $F_3$ and $F'_3$ related to the tertiary or penultimate modulation.

The group of relays GR ($\alpha$, $\beta$, $\gamma$) comprises three relays $F''_3$, $F'''_3$, $F^{IV}_3$ relating to the tertiary modulation, and two relays $F_4$ and $F'_4$ relating to the quaternary or penultimate modulation.

There are therefore in Fig. 5 for each half of the selector system, three relays of index 1 relating to the original input signal modulation itself (instead of only one, Fig. 3), five relays of index 2 relating to the secondary modulation (instead of three, Fig. 3), five relays of index 3 for the tertiary or penultimate modulation (instead of six, Fig. 3), and two relays of index 4 for the quaternary or antepenultimate modulation (there would be 18 of them by extension to three previous or preliminary signals of the circuit of Fig. 3, which is for only two previous signals).

Three distributors delta'' 1, delta''' 1, delta$^{IV}$ 1, are identical one with regard to the other and have the same characters (symbols) as the distributors delta 1 and delta' 1 of Fig. 4 except that they have twenty-seven connections instead of nine, and all synchronized with recorder distributors D, $D_1'$, $D_2$, $D_2'$ of Fig. 3.

The connections being established between these elements as shown in Fig. 5, the connection between the points conversion input $A_1$ and reconversion output $B_1$ (Fig. 3) is only obtained when the three brushes of the distributors delta'' 1, delta''' 1, delta$^{IV}$ 1 (Fig. 5) pass simultaneously over the three connections which have been selected by the relays according to their affiliation to the specific coordinates of the incident modulations group as determined by the polarity of the signal element of that instant, and the three immediately preceding signal elements. For example in the case of the Figure 5, terminals $A_1$ and $B_1$ are in connection when the brushes pass over the connections 16 (the only ones numbered in the figures for reasons of simplification), which corresponds to the group of modulations terminating by the signals:

Antepenultimate: — (Case $\alpha$)
Penultimate: + (Case C)
Ultimate: zero (Case II)
Given signal to be transmitted: +

In other terms, when an incident modulation terminates by these signal elements taken by way of example, the points $A_1$ and $B_1$ are placed in connection at the instant (determined in advance by suitable and identical orientation of the corresponding contacts of the three rotary-distributors) wherein the three brushes of the distributors are in contact simultaneously with the contacts 16.

In the example illustrated in Fig. 3, the trivalent or three value modulation has only been broken up into two bivalent modulations in the part of the advance-corrected modulation transmitter E*m*, which has caused the use of relays outside this part E*m*. The trivalent modulation could be broken up into two bivalent modulations upon the entry of this modulation into the system and these two bivalent modulations could be treated separately from end to end up to and including the advance-corrected transmitter, which produces synthesis of the two bivalent signals to reconstitute the advance-corrected trivalent modulation. This process avoids the use of three-position relays and allows moreover of discriminating the groups of trivalent modulations according to the agreement and the disagreement of the two bivalent modulations without having to take into account the bis and non-bis groups of Fig. 2.

Figure 6:
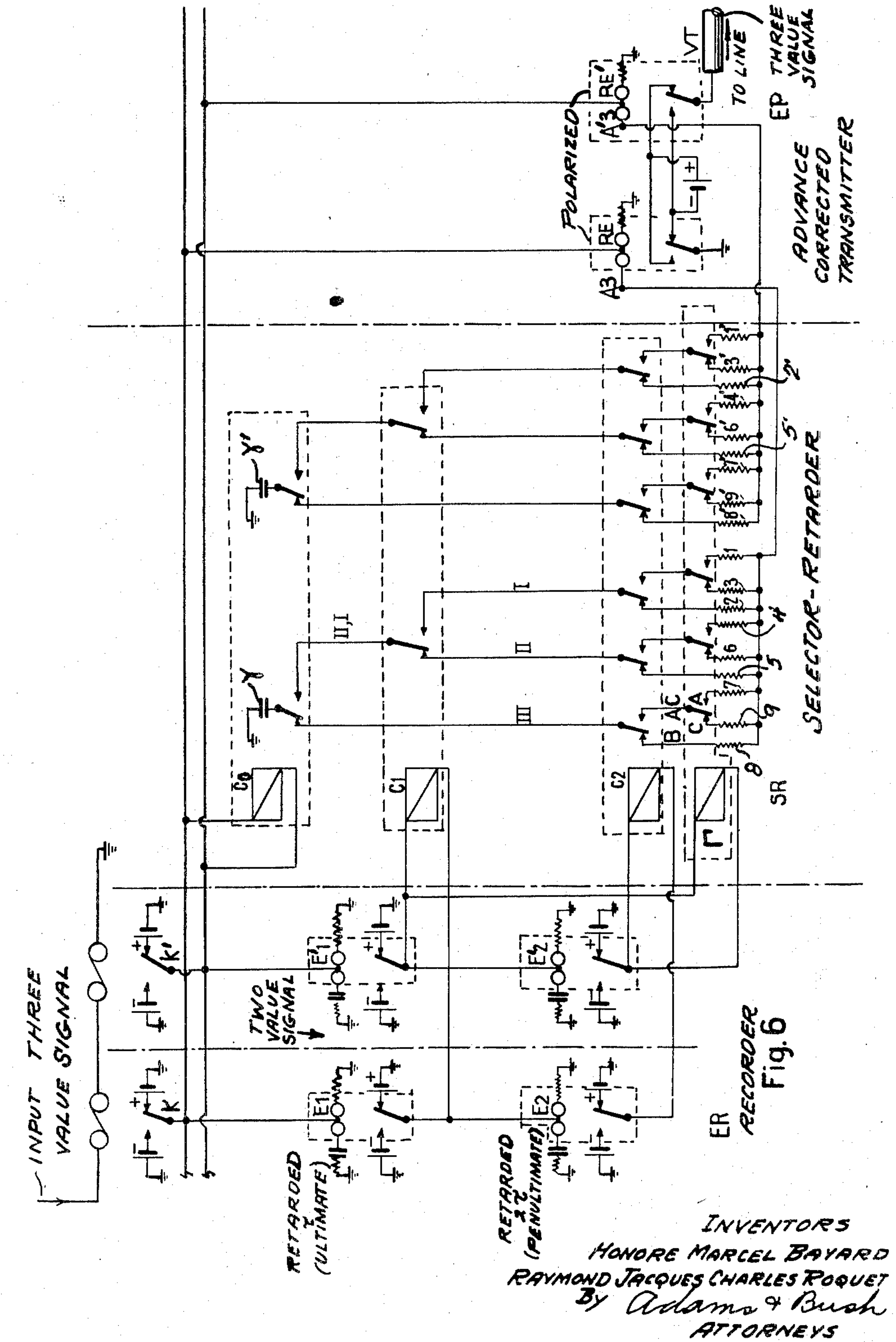
Fig. 6 shows a simplification of the system of Fig. 3, for pre-correction at the transmitter using condenser signal storing and recording means, and two-position selector relays with condenser delay circuits.

Fig. 6 gives an example for carrying into effect an advance corrector device based on this principle.

The part ER represents the recorder, the part SR represents the selector-retarder (these two devices have been united to simplify the figure) and the part EP represents the advance-corrected transmitter.

The input three-value or trivalent signal modulation is broken up into two bivalent or two-value modulations in conformity with the arrangement of the converting polarized relays $G_1$ and $G_2$ of Fig. 3 or by any other procedure. In particular, when the modulator is located in proximity to the advance corrector, it is advantageous to control directly by the modulator, two switches or keys K and K′ having two positions (Fig. 6) the simultaneous positions of which define the two bivalent modulations, which being combined would form the trivalent modulation to be transmitted.

Moreover, to simplify the description and by way of example the following convention is observed:

Any positive signal of the trivalent modulation supplies a positive signal for each of the two component bivalent modulations (in Fig. 6 the two keys or switches K and K′ are then upon their positive contacts):

Any negative signal of the trivalent modulation supplies a negative signal for each of the two bivalent modulations (in Fig. 6 the two switches K and K′ are positioned then upon their negative contacts):

Any zero signal of the trivalent modulation supplies a positive signal for the first bivalent modulation and a negative signal for the second bivalent modulation (in Fig. 6 the switch K is then upon its positive contact and the switch K′ is upon its negative contact).

Figure 7:
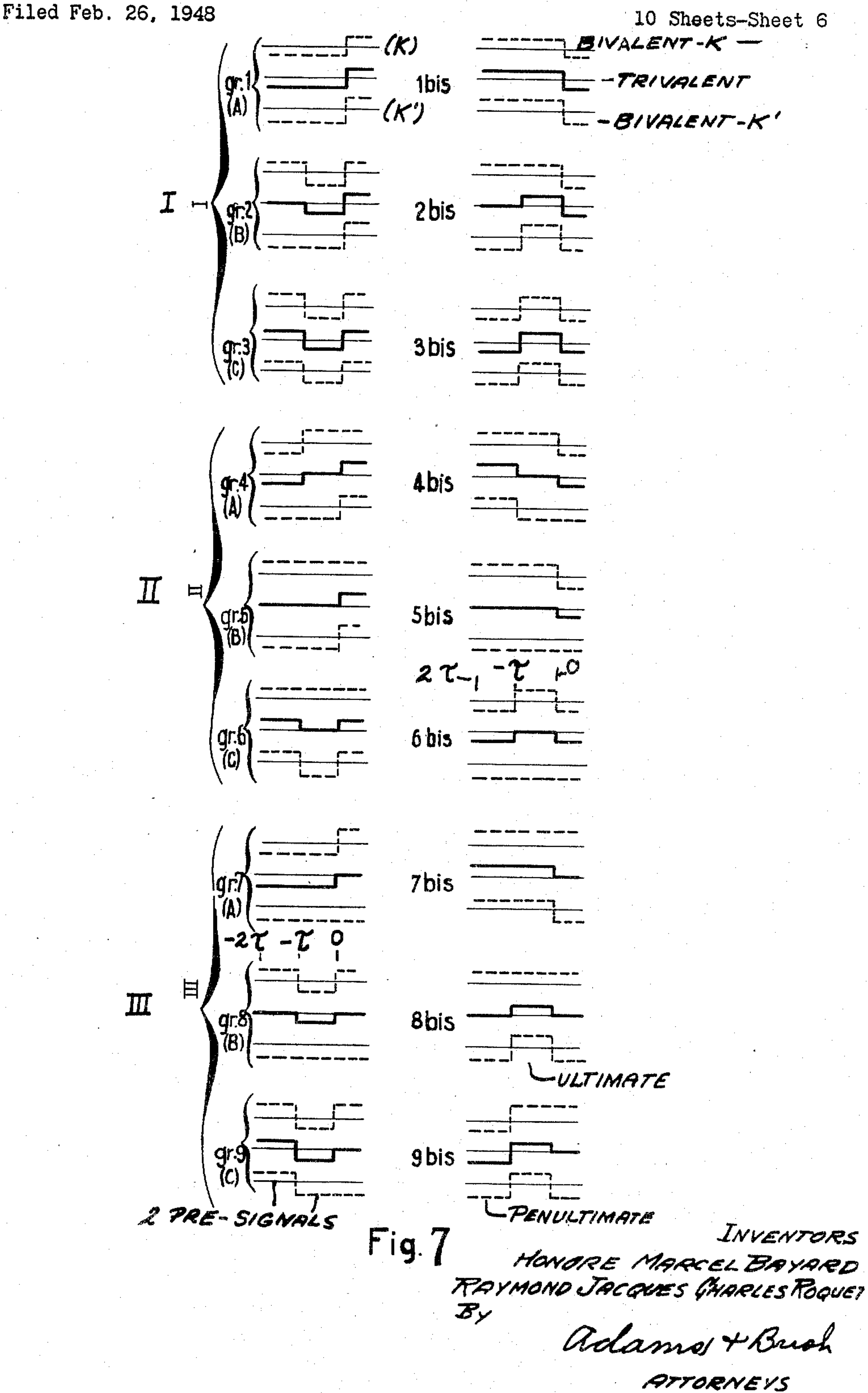
Fig. 7 shows for three successive signal elements of a three-value signal code for a signal having a change in current value from the given signal element to the immediately preceding signal element, the separation of the three-value signal into two corresponding two-value signals shown at the top and bottom of each group.

Fig. 7 shows the breaking up of the eighteen groups of three value or trivalent modulations for two preliminary signal elements of Fig. 2 into two-value or bivalent modulations. The latter are shown, the one over, the other under, the corresponding trivalent modulation: the first corresponds to the modulation generated by the commutator K, the second to that generated by the commutaor K′.

The recorder ER (Fig. 6) is composed of two chains of relays polarized as desired, recording separately for each of the two bivalent modulations, the signal element to be transmitted and the two signal elements immediately preceding it. Figure 6 shows by way of example, relays retarded according to the method covered by our copending application, Serial No. 595,234, filed May 22, 1945, now Patent 2,507,191, patented May 9, 1950, and relating to "Anti-distortion and Retarder Device for the Transmission of Signals."

The relays $E_1$ and $E'_1$ retarded by a duration substantially equal to the duration of one signal element in relation to K and K′ record the last previous or preliminary signal, and the relays $E_2$ and $E'_2$ retarded substantially by twice the duration of one signal element, in relation to $E_1$ and $E'_1$ that is, by twice a signal element in relation to K and K′ record the penultimate preliminary signal element or second preceding signal element.

The respective positions of K and K′ of the armatures of the relays $E_1$, $E'_1$ are determined at any instant by the incident trivalent modulation group.

Figure 8:
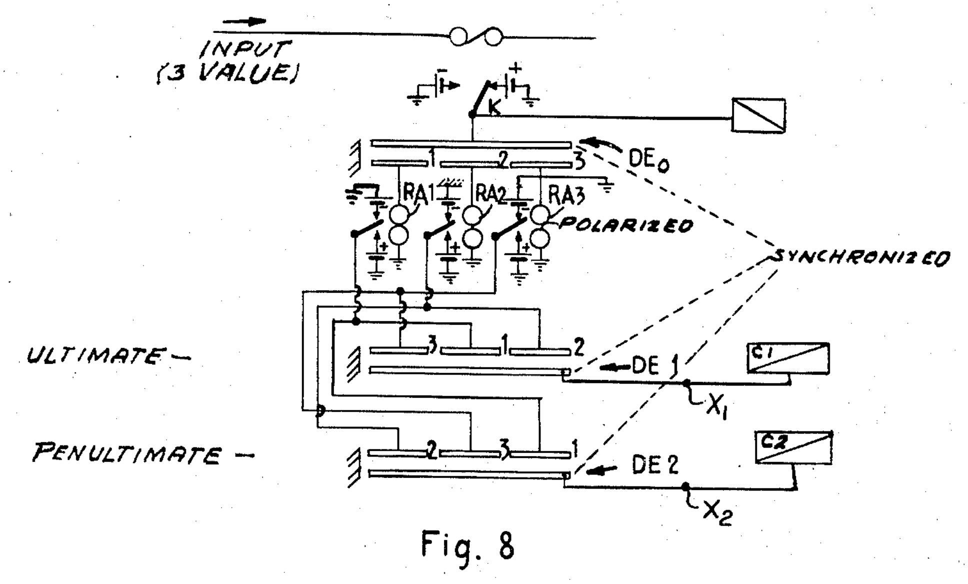
Fig. 8 shows a modified form of signal element storer and recorder for the system of Fig. 6, employing rotary distributors for recording.

Fig. 8 represents another type of recorder which can be used instead of the recorder of Fig. 6, only half of which has been shown, the one which corresponds to the recording of the two-value or bivalent modulation signals produced by switch K. Another identical half must relate to the chain of the switch K′ for the other bivalent modulation component of the original trivalent modulation.

$DE_0$, $DE_1$ and $DE_2$ are rotary distributors shown developed according to the usual representation. They each have three connections of equal number, that is, as many as there are preliminary signals to record, plus one. Their brushes effect one complete revolution during a time equal to three times the duration of the elementary signal. They are exactly in phase with the input modulation and their contacts are numbered as shown in Fig. 8 or, what comes to the same thing, their connections are in correspondence and the brushes are displaced in phase by 120 degrees one in relation to the other.

$RA_1$, $RA_2$ and $RA_3$ are usual relays which may be polarized as desired.

The connections are established as shown in Fig. 8.

The manner of operation of the recorder of Fig. 8 is as follows:

By the operation of the distributor $DE_0$, the relays $RA_1$, $RA_2$ and $RA_3$ are placed successively in relation with the switch K, and they remain in position in turn during three times the duration of the elementary signal element, recording and retaining the signals which succeed each other in regular sequence.

When the brush of $DE_0$ for example passes over the connection 1, the brush of $DE_1$ passes over the connection 3 brought to the potential conferred upon it by the relay $RA_3$ and which corresponds to the last preceding signal element; in the same time interval, the brush $DE_2$ passes over the connection 2 which is brought by the relay $RA_2$ to the potential of the penultimate previous or preliminary signal.

Similar phenomena are produced by circular repetitive sequence in proportion to the rotation of the brushes.

Therefore across the brush $DE_1$ the ultimate or secondary modulation is collected, and the penultimate or tertiary modulation will be collected across the brush $DE_2$, that is, the brush of $DE_1$ (Fig. 8) plays the part of the armature of the relay $E_1$ (Fig. 6), and the brush of $DE_2$ (Fig. 8) plays the part of the armature of the relay $E_2$ (Fig. 6).

The brushes of the other half of the recorder of Fig. 8 for the other bivalent component play identical parts to those of their corresponding brushes of the first half, replacing the armatures of the relays $E'_1$ and $E'_2$ of Fig. 6.

In Fig. 6, $C_0$, $C_1$, $C_2$ and $\Gamma$ are non-polarized relays for instance relays used in automatic telephony but which are sufficiently rapid. These relays comprise several armatures working simultaneously, that is:

| | |
|---|---|
| $C_0$ | 2 armatures |
| $C_1$ | 2 armatures |
| $C_2$ | six armatures |
| $\Gamma$ | six armatures |

It is possible to use relays of which the number of armatures is less, on the condition that a greater number of relays be used and that their excitation windings be connected in such manner that their armatures work as if the relays $C_0$, $C_1$, $C_2$ and $\Gamma$ had the number of armatures indicated. For instance it would be possible to use all relays with two armatures so that there would be one relay each $C_0$ and $C_1$, three relays $C_2$, and three relays $\Gamma$.

In the cases of high rapidity of modulation, it is advantageous to employ, instead of non-polarized relays, telegraph relays polarized as desired excited by means of rectifier cells and furnished with compensating exciting windings according to a usual arrangement.

Selection takes place as indicated hereinbefore: every modulation group belongs in fact to a Case I, II, III, and to a Case A, B, C, Table T1 given above.

According to the circuit shown in Fig. 6 and with reference to Fig. 7, the relay $C_0$ comes into its working position for Case III, and to the stationary position for Cases I and II, the relay $C_1$ comes into operation for Case II and into the stationary position for Cases I and III. The association of these two relays allows consequently of distinguishing Cases I, II and III one from the other. The relay $\Gamma$ comes into the operated position for the case C and into the stationary position for cases A and B, and relay $C_2$ comes into operated position for case B and comes into the stationary position for cases A and C.

The association of relays $C_2$ and $\Gamma$ allows of distinguishing Case A, B, and C one from the other.

The modulation groups are therefore selected and for each of them, two identical circuits are established specific to this modulation group.

With further reference to Fig. 6, these circuits are completed, the first by a condenser $\gamma$ and the second by a condenser $\gamma'$ of the same capacity as $\gamma$, and by resistances 1, 2, 3, . . . 9: 1', 2', 3', . . . 9'. The resistances 1, 2, 3, . . . 9 have values which in general are different from each other but equal respectively to the values of the resistances 1', 2', 3', . . . 9'.

With further reference to Fig. 6, the output transmitting relays RE and RE' are polarized relays of usual type. The first is connected to the bar connected to the key or switch K and the second to that connected to the key or switch K'.

Assuming provisionally that the connections at $A_3$ and $A'_3$ are cut, the relays RE and RE' will reconstitute the original input signal trivalent modulation without alteration. But the insertion in the current leading to $A_3$ of a condenser $\gamma$ and of a resistance, one of the resistances 1, 2, 3, . . . 9, has the effect of retarding the operation of this corresponding relay according to the description found in application Serial No. 595,234, already mentioned, now Patent No. 2,507,191.

Since output transmitting relay RE' is connected at $A'_3$ to a circuit which is always identical with that connected at $A_3$ to the relay RE, the relay RE' will work always with the same retardation as the relay RE.

The two output relays RE and RE' then operate simultaneously but with a retardation which is imposed by the retarder unit SR.

It is sufficient to regulate this retardation, that is, to confer upon the condensers as $\gamma$ and the resistances, as 1, 2, 3, . . . suitable values determined experimentally by measurement or by calculation, to cause the desired advance correction of the three-value or trivalent modulation transmitted in the transmission line VT of Fig. 6.

In the case in which owing to the time of operation of the relays of the selector, the retardation circuits of the relays RE and RE' would not be ready at the instant at which the keys or switches K and K' are in contact respectively with the relays RE and RE', it would be necessary slightly to retard this contact by inserting, acting additively to the relays RE and RE', a relay retarded by a few milliseconds. This has not been shown in Figure 6 for purposes of simplification.

It will be evident that the retarder circuit indicated in Fig. 6 has only been given by way of example, and that it is possible in particular to retard the relays employing different circuits such as those indicated in our application Serial No. 595,234, hereinbefore mentioned, now Patent No. 2,507,191, or by means of distributors or by any other suitable means.

In the case of slow modulation and where it is necessary to obtain considerable retardation in the advance correction by means of retarded relays, it is advantageous to employ a cascade of relays in order to avoid introducing stray distortion.

The retardation of the relays comprising the cascade arrangement is obtained by one of the methods described, adding if required complementary armatures to the selector relays.

Assuming that there is being transmitted a group of successive signal elements which belong to Case I and Case A of Table T1, that is, to group 4 of Fig. 7, and that condensers $\gamma$ and $\gamma'$ have been respectively placed into communication with output transmitting relays RE and RE' over the circuit: rest contact of relay $C_0$, operated contact of relay $C_1$, rest contact of relay $C_2$, rest contact of relay $\Gamma$, either resistance 4 or 4' (which are equal). The relays RE and RE' are controlled by switches K and K', but respond with a delay which depends on the value of the condenser $\gamma$ (or $\gamma'$) and the resistance 4 (or 4'). The condensers are the same whatever may be the group of successive signal elements concerned. The resistances are individual to each of these groups and their choice determines the delay of response of the relays. It may be assumed that, by reason of an experimental or theoretical determination, it is known that the alternation to be transmitted should be given a delay equal to one-fourth of the duration of a signal element, that is to say, that the characteristic instant should be displaced from the zero instant of time to an instant later than zero by one-quarter of the duration of one signal element. The responses of relays RE and RE' will undergo a delay of one-fourth of the duration of one signal element, and a corresponding sequence of signal elements will be sent out on the transmission line from the respective contacts of transmitting relay RE and RE', and this sequence of signal elements has been precorrected. The same operations occur for other sequences of signal elements, except that the resistance inserted in circuit is not always resistance 4 (or 4'), and the respective alternations are more or less delayed according to the value of this resistance, that is, according to which group of values of signal elements it belongs to.

Figures 9, 10:
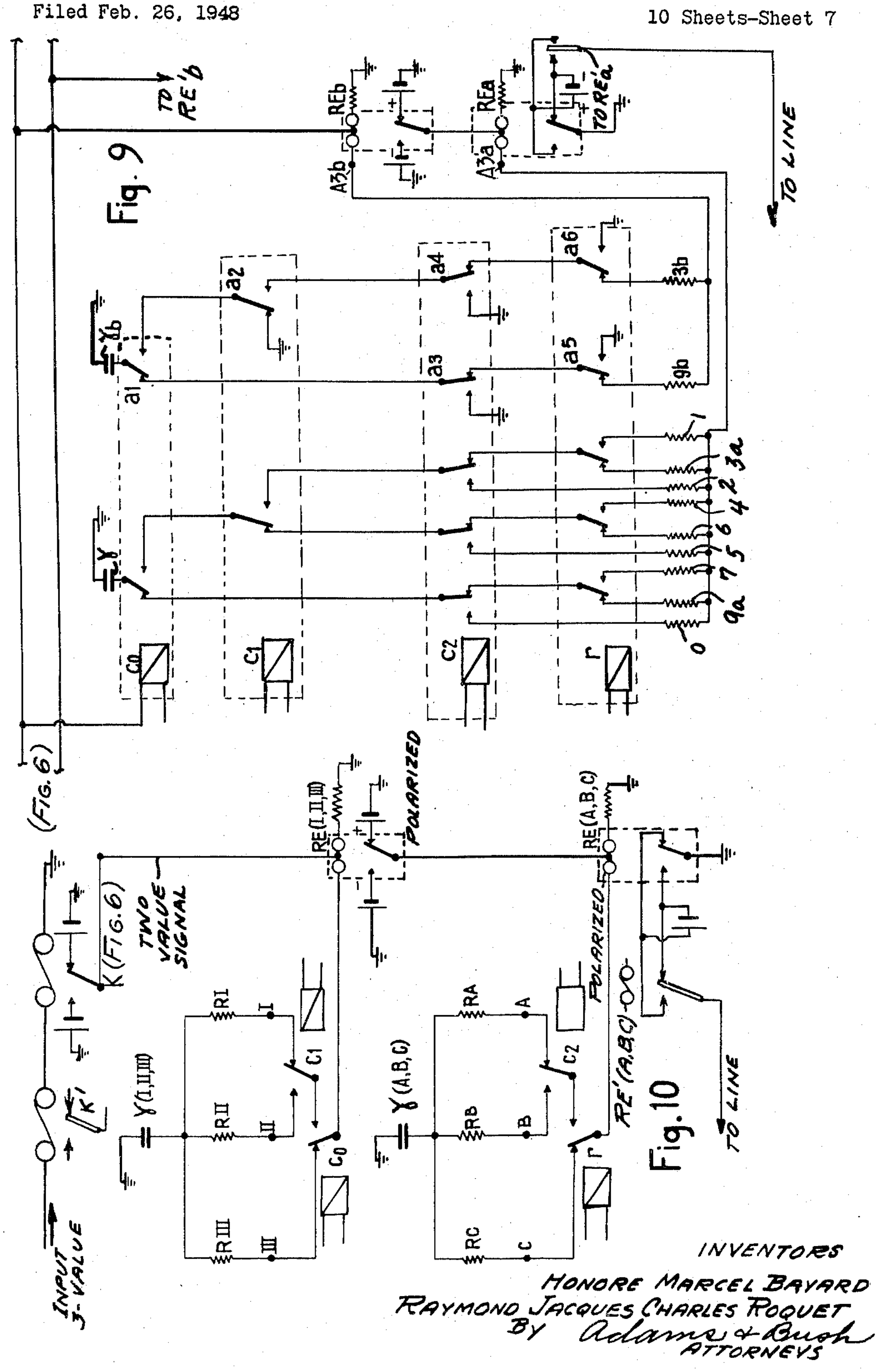
Fig. 9 shows a modified form of selector and retarder for the system of Fig. 6, for use with high values of retardation.
Fig. 10 shows a modification of the selector-retarder-transmitter of Fig. 6, for directly adding the individual retardations characteristic of particular groups of sequences of signal elements.

Fig. 9 shows an example of such an arrangement for high values of retardation in the form of a portion of the circuit comprising a chain of two relays RE*b* and RE*a* replacing the relay RE of Fig. 6. A similar chain of two relays would replace the relay RE' of this same Figure 6.

It is assumed by way of example that the groups of modulations 3 and 9 must be subjected to the greatest retardations comparatively to the others. In Fig. 9 RE*b* and RE*a* are relays polarized as desired.

$\gamma_b$ is a condenser, 3*b* and 9*b* are resistances, $a_1$, $a_2$, $a_3$, $a_4$, $a_5$ and $a_6$ are supplementary armatures of the relays $C_0$, $C_1$, $C_2$, and Γ according to the showings of Figure 6, 1, 2, 4, 5, 6, 7, 8, of the resistances, and γ is a condenser playing the same part as the resistances and the condenser designated by the same notations in Fig. 6, 3*a* and 9*a* are resistances playing respectively the part of the resistances 3 and 9 of Fig. 6. The relay $C_0$ of Fig. 9 differs from the relay $C_0$ of Fig. 6 in that in Fig. 6 this relay has an extra armature $A_1$. Further, in Fig. 6, the relay $C_1$ has an additional armature $A_2$, the relay $C_2$ has two additional armatures $A_3$ and $A_4$, and relay Γ has two additional armatures $A_5$ and $A_6$.

The manner of operation of the arrangement of Fig. 9 is as follows:

When one of the modulation groups 1, 2, 4, 6, 5, 7 or 8 is incident, the relay RE*b* acts as a non-retarded relay, in fact the circuit leading to terminal A3*b* is open. Therefore it controls immediately the relay RE*a* which operates with a certain retardation according to the resistance introduced into its circuit by the operation of the selector. But when a group 3 or 9 is incident, 9 for example, the selector places in circuit the resistance 9*b* and the condenser $\gamma_b$, the effect of which is to retard the relay RE*b*. The relay RE*a* is only actuated after the relay RE*b* has responded and as it is also retarded by the operation of the selector (the condenser γ and the resistance 9*a*) the two retardations are added one to the other.

With reference to both Fig. 6 and Fig. 9, it is observed in particular when the transition curve of the transmission line to which the signal is applied is increasing, that the retardations to be conferred upon the transmitting relays ($RE_1$, Fig. 3; RE, Fig. 6; RE*a* and RE*b*, Fig. 9, and their corresponding relays) are approximately equal to the sum of two retardations: the one specific to the case of the series I, II, III to which belongs the incident modulation group, the other specific to the case of the series A, B, C to which it likewise belongs. The transition curve is the curve representing the successive values of the current as a function of time, that is, the curve according to which the current builds up from zero in a circuit.

For example, the advance correction retardation corresponding to the group of modulations 8 appertaining to the Cases II and B is substantially equal to the sum of a specific retardation of Case III (which will be the same either, for Cases A, B and C) and of a specific retardation of Case B which will be the same either for Cases I, II and III.

This observation extends to *n* previous or preliminary signals, where *n* is as desired. Any retardation in the advance correction for $n=3$ for example, is substantially the sum of three retardations, the one of the series I, II, III, and the other of the series A, B, C, the third being of the series α, β, γ.

Although the additive properties of the series of the advance correction retardations is not strict, it is sufficiently close to supply good results in practice.

Fig. 10 gives an example of an application of this additive property as a modification of the retarder of Fig. 6.

In this figure:

$C_0$, $C_1$, $C_2$, Γ are the armatures of the selector relays already represented under the same notation in Fig. 6, but with one single armature for each of the halves of the selector-retarder unit.

RE (I, II, III) and RE (A, B, C) are ordinary relays polarized as desired. γ (I, II, III) and γ (A, B, C are condensers. RI, RII, RIII, RA, RB, RC are resistances. K is the switch or key already shown in Fig. 6.

The unit of Fig. 10 replaces the unit of selector-retarder-transmitter for the bivalent signal modulation produced by the key or switch K, including the transmitting relay RE (Fig. 6).

By the operation of the armatures of the relays $C_0$ and $C_1$, which place in circuit one of the resistances RI, RII or RIII, and the condenser γ, (I, II, III), relay RE (I, II, III) is subjected to specific retardations of the case I, II, or III, which may present itself.

By the operation of the armatures of the relays $C_2$ and Γ which place in circuit one of the resistances RA, RB, or RC and the condenser γ (A, B, C), the relay RE (A, B, C) is subjected to specific retardation of the case A, B or C which may present itself.

Since the armature of the relay RE (I, II, III) controls the relay RE (A, B, C), it will be seen that the two retardations are additive.

It would moreover have been possible to control the relay RE (I, II, III) by the armature of the relay RE (A, B, C), their order being different.

The circuit of Fig. 10 may be extended to the case of *n* preliminary signals, *n* being as desired.

When the retardations of advance correction are effected by means of retarder networks, one may dispense with relays in cascade. The addition of the retardations may in fact be obtained approximately by associating the elements of the retarder network corresponding to the cases of series I, II, III with the elements corresponding to the cases of the series A, B, C. For example, the advance correction retardation to be conferred upon the transmitting relays for the group of signal modulations (8) will result substantially from the addition of the elements of the retarder network specific to the Case III to the elements of the retarder network specific to Case B.

Figures 11, 12:
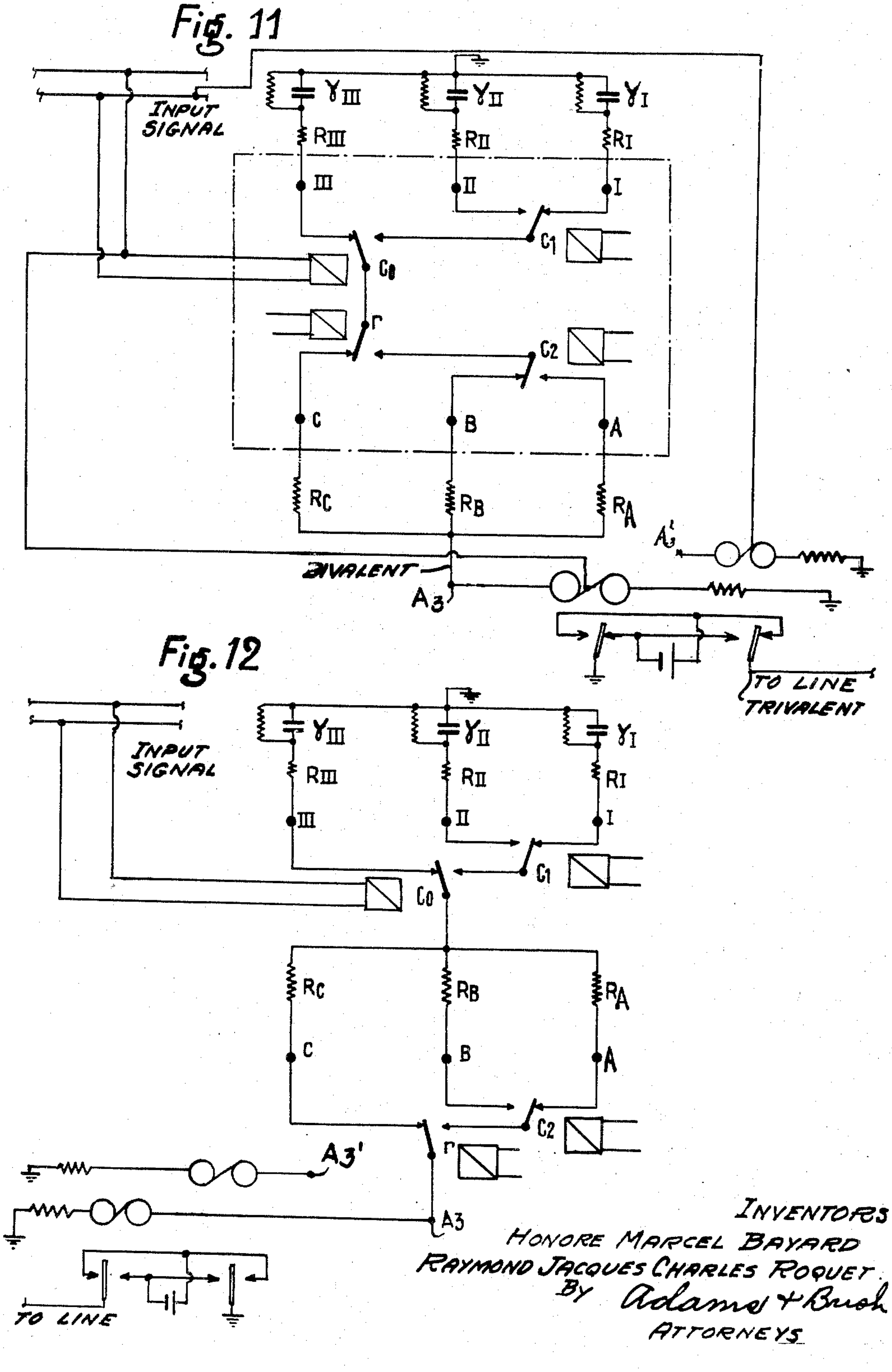
Fig. 11 shows a modification of the system of Fig. 6 wherein condenser-resistance circuit units are used to retard signal elements.
Fig. 12 shows a simplified rearrangement of Fig. 11.

Figure 11 shows the circuit of a selector-retarder unit of Fig. 6 based upon this last mentioned arrangement, using retarder networks.

In this Fig. 11, for the sake of simplification the excitation windings of the relays $C_0$, $C_1$, $C_2$ and Γ have not been shown, these being the same as in Fig. 6. For the same purpose of simplification, only half of the selector-retarder unit has been shown, that for instance which in Fig. 6 would be substituted for the circuits ending at the point $A_3$ for one bivalent component. The other half, identical, would be substituted for the circuits ending at $A'_3$ for the other bivalent component. In the following description this second half is not mentioned.

The relays $C_0$, $C_1$, $C_2$ and Γ only have one armature for each half of the selector-retarder unit. The armatures of the relays $C_0$ and $C_1$ discriminate the Cases I, II and III and that of the relays $C_2$ and Γ discriminate the cases A, B and C. The unit enclosed in dash lines in Fig. 11 ensures the association of the cases according to the group of incident modulations.

The specific retarder elements of Cases I, II, III are in Fig. 11 the shunted condensers γI, γII, and γIII, and the resistance R, RII, RIII. Those which are specific to the Cases A, B, C are the resistances RA, RB, and RC. The apparatus provides for the placing in series of the retarder elements according to the incident modulation, the one of series I, II, III, the other of the series A, B, C. It will be appreciated that these elements and associations of retarder elements are only given here by way of example; experiment or calculation may supply others, for example a single common condenser or a common resistance or contact of one or more windings of the relay RE and so forth. The selection of the elements to be associated depends in practice on the one hand on the advance correction to be obtained, that is, of the conditions of transmission, and on the other hand, on the network of the retardation curves of the relay RE as a function of the retarder elements.

Therefore it is not possible to give a definite general rule, but it may be mentioned that the examination of the networks of the observed retardation curves, reveal clearly the region in which experiments may yet be made by successive approximations.

It is to be noted when comparing Figs. 4 and 11, that the selector plays the same part in both the figures, that is, that it brings about in the same manner (resulting from the remarks made about Table T1 above) although by different methods, the connection of one of the terminals I, II, III with one of the terminals A, B, C, according to the incident group of signal modulations.

Therefore it is possible to utilize as desired one or the other of these selectors, either with distributors or with retarder circuits.

By simple transformation, altering nothing in the principle or in the manner of operation, it is possible to replace the circuit of Fig. 11 by that of Fig. 12.

Figure 13:
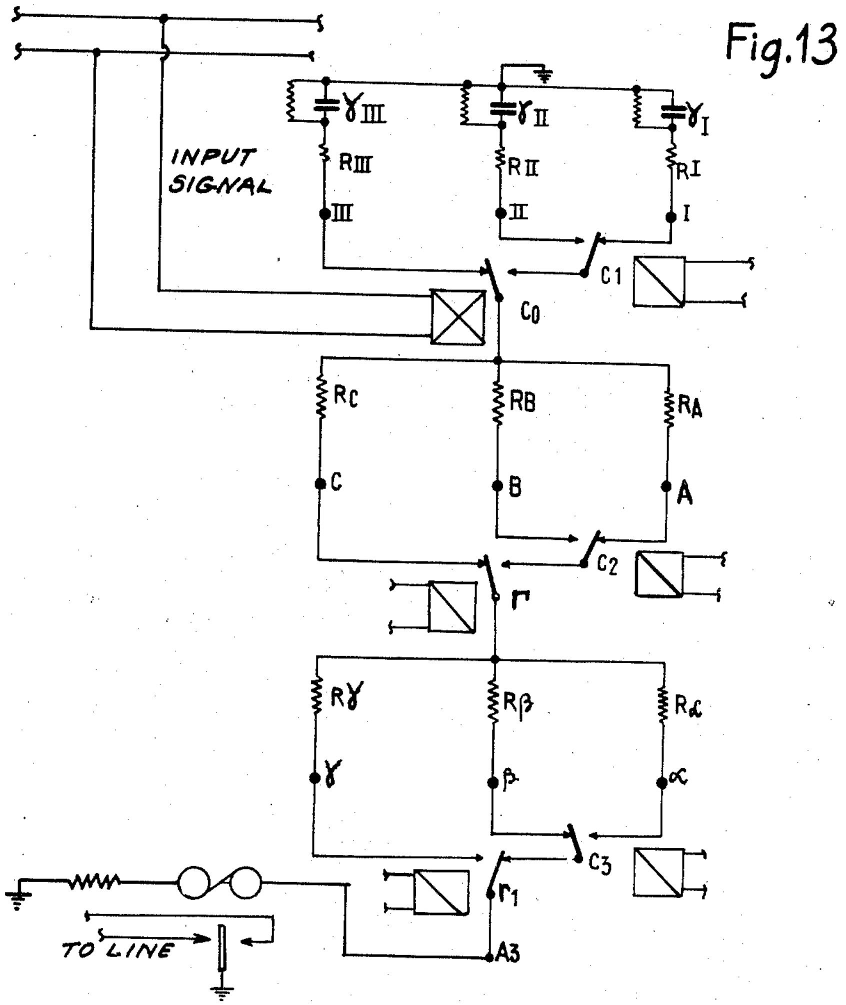
Fig. 13 shows a modification of the arrangement of Fig. 12, to take care of three preliminary signal elements preceding the given signal element, instead of only two such preliminary signal elements as in Fig. 12.

In this form it evidently extends to $n$ preliminary signals as indicated by way of example in Fig. 13 for $n=3$.

In Fig. 13, $C_3$ and Γ1 correspond to $C_2$ and Γ but are for the quaternary or antepenultimate stage of the two bivalent or two-value-modulations, RI, RII and RIII (associated respectively with the shunted condensers) γI, γII and γIII are the specific retarded elements for the Cases I, II, III; RA, RB and RC are those specific to the Cases A, B, C, and Rα, Rβ, Rγ are those specific to the Cases α, β, γ. It will be seen that the retardation (advance-correction) applied to the transmitter relays corresponds to the placing in series of an element taken in each of the three series I, II, III, A, C, B, and α, β, γ.

Figure 14:
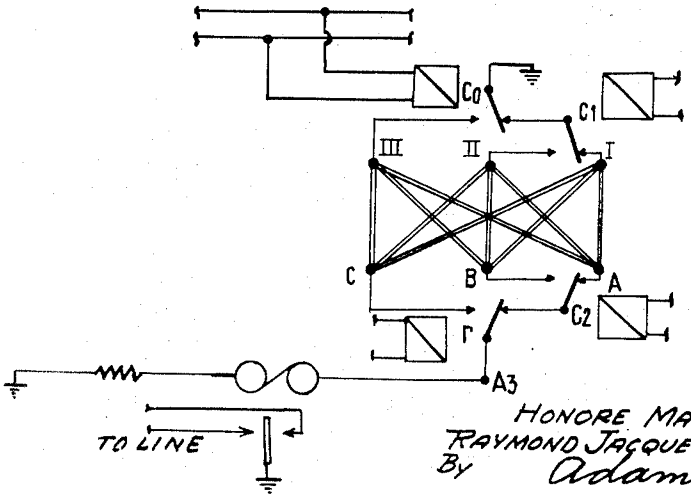
Fig. 14 shows diagrammatically in condensed manner, a more elaborate manner of interconnecting the several terminals of Fig. 11 characteristic of different signal element sequences, to obtain more accurate retardation and correction of signal elements.

More generally, it is possible to combine retarder circuits not by simple addition of certain of their elements, as in the arrangements of Figs. 11 and 12, which is often too rough taking into consideration the quality required, but in more complex manner to furnish a greater diversity in the values obtained and consequently, to get closer exactitude in the retardations to be obtained by associating the terminals I, II, III on the one hand, A, B, C, on the other hand, two by two, Fig. 14 gives an embodiment by way of example derived from Fig. 11 wherein it is necessary to consider each connection shown diagrammatically in condensed manner in double line as representing in reality an association of resistances, capacitances and inductances.

Considering that among the 16 possible positions of the armatures of the relays $C_0$, $C_1$, $C_2$, Γ, nine only are capable of defining the impedance ending at the point $A_3$, it will be seen that there are nine simultaneous equations with nine unknown allowing on principle of calculating the nine impedances supplying the desired retardations.

However it should be noted that according to the essential principle of advance correction, one of the retardations is arbitrary, which reduces to eight the number of equations and unknowns of the system of equations to be solved. In practice these calculations may be dispensed with and the impedances may be determined experimentally.

According to its principle, advance correction consists in causing to coincide, characteristic instants of the modulation received with the exception of the residual distortion of the group which remains when correction is not complete, that is, the instants when there is a change in current value, with a succession of instants regularly spaced. This implies evidently that the condition of reception of all the signals, termed fidelity of reception, be previously satisfied. Fidelity of reception is attained when the receiving relay armature displaces upon each change of value of the transmitted current, without any omission.

Now in practice it is not always possible to satisfy at the same time, in spite of the advance correction, the conditions of fidelity of reception and zero distortion. The condition of zero distortion exists when all the signal elements are received with the same identical delay.

When such a case presents itself, piecemeal advance correction is practiced: this consists in individualizing the Cases I, II, III and in satisfying for each of them taken separately, the two conditions of fidelity and non-distortion. The precorrection is "fragmentary" when it consists in adjusting separately the delay of the groups of modulations corresponding to the different cases designated I, II, III. The advance-correction system in accordance with this present invention, a few embodiments of which have been given by way of example hereinbefore, is suitable without modification for the piecemeal advance correction; in fact it is sufficient to regulate the retardations to be applied to the transmitter according to the results to be obtained. Let it be assumed for example that the function of transition be an increasing one, then the groups 1, 4 and 7 are not retarded and the retardation of the other groups is regulated in such manner that the two conditions are satisfied separately for Cases I, II, III. The function of transition, represented by the "transition curve," is the curve representing successive values of current as a function of time, that is, the curve according to which current builds up from zero in a circuit, and may not increase throughout the entire interval of reaching a steady state.

It is always of advantage to seek to find, experimentally or theoretically, whether it is possible to approximate the grouped characteristic instants of the modulation received after the piecemeal advance correction, while retaining the fidelity of reception, even if it be at the cost of an acceptable additional distortion.

This method of advance correction termed mixed advanced correction, is practiced in the example selected by retarding progressively the groups 4 and 7 and by modifying proportionately the retardations to be applied to the other groups up to the limit which can be accepted, taking into account the properties of the telegraph apparatus which perform the translation. According to one preferred method, the operation is effected thus, and experience shows whether in the limit case, one will or not attain the two-fold ideal condition.

When piecemeal or mixed advance correction is practiced, the modulation received is distorted, for its characteristic instants are presented differently according as to whether they belong to Case I or to Case II or to Case III. But this particular distortion is differentiated from the ordinary distortion in that the characteristic instants belong to these three cases alone, and not to infinity (neglecting always the residual distortion of the group), that is, the distortion which remains when the correction is not complete.

For example, a modulation in the recorder code transmitted across a rising transition curve line after piecemeal advance correction, would comprise constant elongation at the first signal and likewise constant shortening of the last one.

The modulation received after transmission by piecemeal or by "mixed" advance correction, has many great advantages compared to the modulation which would be received without advance correction (all things being equal) and in certain cases, this may be considered to be sufficient.

But it is also possible by means of adding a post-correction apparatus positioned on the reception side, to correct this particular distortion. In fact it is sufficient to analyze the modulation received in order to distinguish for each signal, whether it belongs to Case I, II or III, and to correct according to the case selected, a final receiver in order to bring about coincidence of the characteristic instants of the modulation finally received with those of perfect modulation. The post-correction apparatus is consequently nothing other than an advance corrector according to this present invention, with one preliminary signal. However, it must necessarily comprise a retarder device with constant retardation between the modulation received from the line and the final receiver. The retardation produced by this apparatus must be greater than the greatest deviation to be post-corrected.

Figure 15:
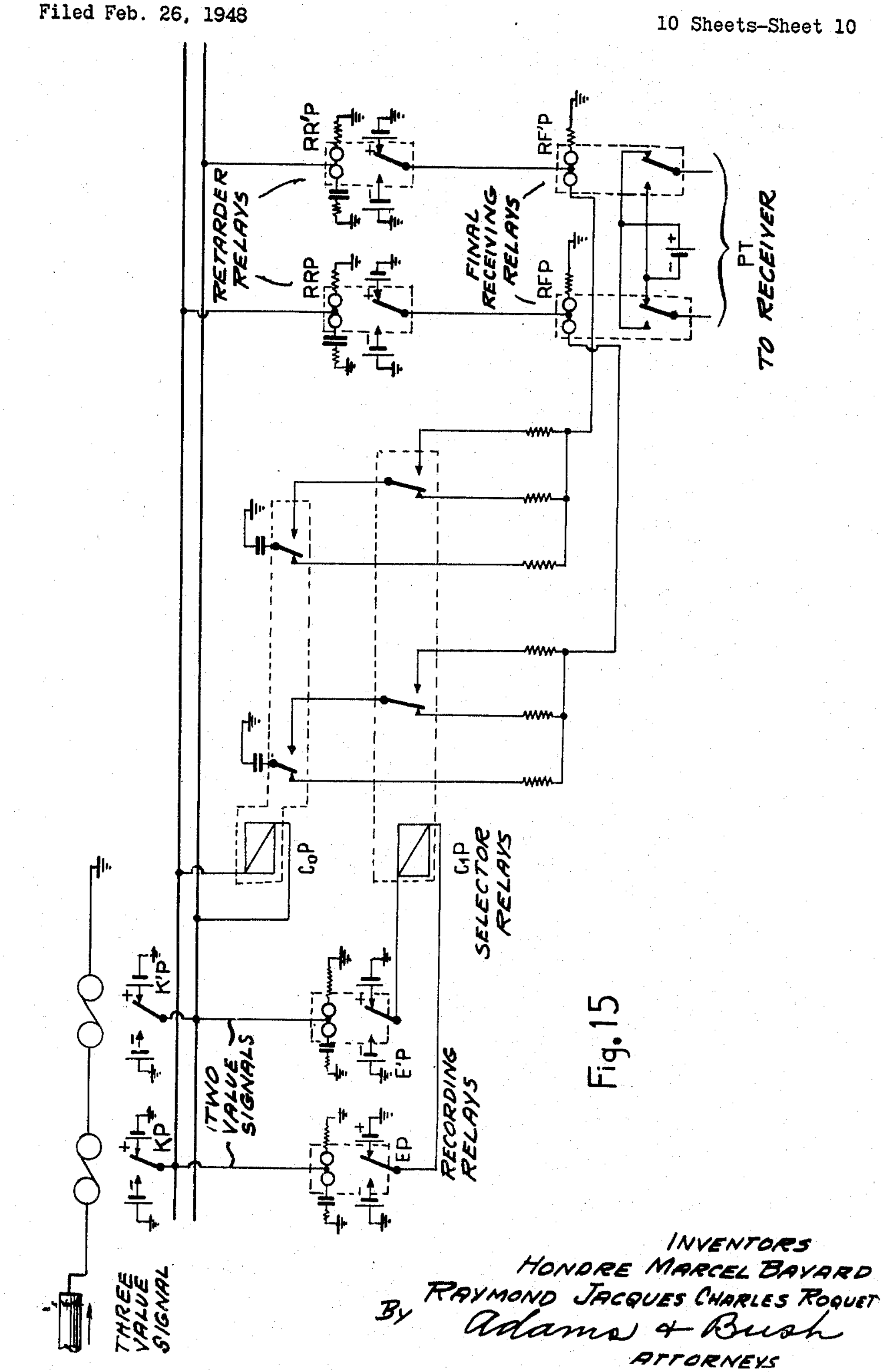
Fig. 15 shows a post-correction system for use at a receiving station for correcting for line distortion and restoring the perfect modulation as originally transmitted, using recording, selecting, and retarding means, similar to that described for pre-correction.

Fig. 15 gives an example of a circuit for such a post-corrector like that of the advance corrector of Fig. 6.

In Fig. 15:

KP and K'P are the armatures of the cable relays, or those of a secondary relay: EP and E'P are the recording relays: $C_0P$ and $C_1$ are the relays providing for the selection, RRP, and RR'P are the retarded relays inserted between the modulation generated by KP and K'P and the final receiving relays RFP and RF'P.

The perfect modulation obtained (with the exception of the residual distortion of the group) is sent at RT to the telegraph apparatus having to reproduce or translate or transfer it.

It is possible to use a post-corrector of any type without restricting the type of advance corrector which is found at the transmitting end of the line. However, it might be desirable in the case in which the advance correction would relate to the analysis of more than two preliminary signals, to utilize a post-corrector itself comprising more than one preliminary signal, although this is not absolutely obligatory.

Finally it should be stated that after advance correction (normal, piecemeal, or mixed) it is sometimes necessary to modify the double sensitivity threshold of the cable receiving relay, in order to obtain the best reception conditions. Then there is obtained optimum regulation by successive approximations by influencing alternatively the advance correction and the double sensitivity threshold which, in any case, must remain symmetrical. The threshold sensitivity of a polarized relay is the value of current just sufficient to swing its armature from one contact to the other. The "double sensitivity threshold" covers both the value of current necessary to swing the armature of a polarized relay from plus to minus and also the value of current necessary to swing the armature from minus to plus. These two values of current are not necessarily equal, if the relay is not symmetrical.

It will be apparent to those skilled in the art that our invention is susceptible of modifications to adapt the same to particular applications, and all such modifications which are within the scope of the appended claims, we consider to be comprehended within the spirit of our invention.

We claim:

1. In a distortion pre-corrector for a telegraph transmitter, for three value code signals using equal length signal elements, a signal source of a three-value code signal, a recorder comprising rotary switch distributors driven in synchronism with the frequency of the elements of said code signal, and adapted to respectively store the two signal elements immediately preceding a given signal element, secondary control means actuated by a first said distributor storing the first preceding signal element, tertiary control means actuated by a second said distributor storing the second preceding signal, a primary three position relay having its actuating winding connected for actuation by said signal source, and having its armature connected for controlled energization by energy derived from said signal source, a group of three secondary three position relays having their actuating windings connected in series for control by said secondary control means, and having their three armatures respectively connected to the three controlled contacts of said primary relay, three pairs of tertiary three-position relays having their actuating windings connected in series for control by said tertiary control means and the armatures of each said pair being respectively separately connected to two of the controlled contacts of each of said secondary relays, plural terminal rotary signal retarding means driven in synchronism with said distributors, connections from the controlled contacts of said tertiary relays to said retarding means, and output signal transmitting means connected for actuation by said retarding means.

2. A distortion pre-corrector according to claim 1, comprising two units each as recited in claim 1, and converting means interposed between said signal source and the respective armatures of the respective said first relays of each of said units and adapted to convert three value signals from said source into two corresponding two-value signals and apply each said two-value signal to a said armature of a said primary relay, and reconverting means connected to the outputs of the two said retarding means of said two units and adapted to reconvert said two two-value signals into one corresponding three value signal and apply the same to said output signal transmitting means.

3. In a distortion pre-corrector for a telegraph transmitter, for three-value code signals using equal length signal elements, a signal source of a three-value code signal, a recorder comprising rotary switch distributors driven in synchronism with the frequency of the elements of said code signal and adapted to respectively store the two signal elements immediately preceding a given signal element, secondary-control means actuated by a first said distributor storing the first preceding signal element, tertiary control means actuated by a second said distributor storing the second preceding signal element, primary relay means connected for actuation by said signal source and having its armature means connected for controlled energization by energy derived from said signal source, secondary relay means connected for actuation by said secondary control means, tertiary relay means connected for actuation by said tertiary control means, said three relay means comprising controlled contacts and interconnections between their respective armatures and controlled contacts adapted to select one of a plurality of possible sequences of three successive signal elements of said three-value code signals, output connections from said relay means connected for respectively receiving one of said possible sequences of signal elements so selected, plural terminal rotary signal retarding means driven in synchronism with said distributors, connections from said output connections of said relay means to said retarding means, and output signal transmitting means connected for actuation by said retarding means.

4. A distortion pre-corrector for a telegraph transmitter for three-value code signals according to claim 3, comprising two units each as recited in claim 3, and converting means interposed between said signal source and the armature means of said primary relay means of each of said units and adapted to convert three-value signals from said source into two corresponding two-value signals and applying each said two-value signal to a said armature of a said primary relay, and reconverting means connected to the outputs of the two said retarding means of said two units and adapted to reconvert said two two-value signals into one corresponding three-value signal and apply the same to said output signal transmitting means.

5. In a distortion pre-corrector for a telegraph transmitter, for three-value code signals using equal length signal elements, a signal source of a three-value code signal, a recorder comprising rotary switch distributors driven in synchronism with the frequency of the elements of said code signal and adapted to respectively store the two signal elements immediately preceding a given signal element, secondary-control means actuated by a first said distributor storing the first preceding signal element, tertiary control means actuated by a second said distributor storing the second preceding signal element, a first rotary switch having its brush connected to said signal source and the several contacts of its bank connected to controlled contacts of said primary relay means, secondary relay means connected for actuation by said secondary control means, tertiary relay means connected for actuation by said tertiary control means, said three relay means comprising controlled contacts and interconnections between their respective armatures and controlled contacts adapted to select one of a plurality of possible sequences of three successive signal elements of said three-value code signal, a second rotary switch driven in synchronism with said first rotary switch and comprising signal retarding means, and having the several contacts of its bank connected to output controlled contacts of said tertiary relay means, and output signal transmitting means connected to the brush of said second rotary switch.

6. In a distortion pre-corrector for a telegraph transmitter for three-value code signals using equal length signal elements, a signal source of a three-value code signal, a recorder comprising rotary switch distributors driven in synchronism with the frequency of the elements of said code signal and adapted to respectively store the three signal elements immediately preceding a given signal element, secondary control means actuated by a first said distributor storing the first preceding signal element, tertiary control means actuated by a second said distributor storing the second preceding signal element, primary relay means connected for actuation by said signal source, secondary relay means connected for actuation by said secondary control means, tertiary relay means connected for actuation by said tertiary control means, quaternary relay means adapted for actuation by the third signal element immediately preceding the given signal element to be pre-corrected, said four relay means comprising controlled contacts and interconnections between their respective armatures and controlled contacts adapted to select one of a plurality of possible sequences of four successive signal elements of said three-value code signals, output connections from said relay means connected for respectively receiving one of said possible sequences of signal elements so selected, plural terminal rotary signal retarding means in synchronism with said distributors, connections from said output connections of said relay means to said retarding means, and output signal transmitting means connected for actuation by said retarding means.

7. In a distortion pre-corrector for a telegraph transmitter for three-value code signals using equal length signal elements, a signal source of a three-value code signal, a recorder adapted to separately store each of a determined number of signal elements immediately preceding a given signal element, a plurality of individual control means actuated by said recorder respectively for each said preceding stored signal element, a plurality of groups of relays, the number of said groups of relays being equal to the number of said control means plus one, the first said group comprising one relay having its actuating winding connected for actuation by said signal source and having its armature connected for controlled energization by energy derived from said signal source, the relays of each subsequent group having their actuating windings connected in series for control by the said control means corresponding to that group and having their armatures respectively connected to the controlled contacts of the relays of the preceding group corresponding to the preceding signal element, terminal signal retarding means, connections from the controlled contacts of the relays of the last said group to said retarding means, and output signal transmitting means connected for actuation by said retarding means.

HONORÉ MARCEL BAYARD.
RAYMOND JACQUES CHARLES ROQUET.

No references cited.